United States Patent
Zhou et al.

(10) Patent No.: US 10,035,436 B2
(45) Date of Patent: Jul. 31, 2018

(54) CHILD CAR SEAT

(71) Applicant: Goodbaby Child Products Co., Ltd, Kunshan, Jiangsu (CN)

(72) Inventors: Binqing Zhou, Jiangsu (CN); Zhiyong Kuang, Jiangsu (CN)

(73) Assignee: Goodbaby Child Products Co., Ltd., Kunshan, Jiangsu (CN)

( * ) Notice: Subject to any disclaimer, the term of this patent is extended or adjusted under 35 U.S.C. 154(b) by 227 days.

(21) Appl. No.: 14/909,728

(22) PCT Filed: Sep. 17, 2013

(86) PCT No.: PCT/CN2013/083614
§ 371 (c)(1),
(2) Date: Feb. 2, 2016

(87) PCT Pub. No.: WO2015/014008
PCT Pub. Date: Feb. 5, 2015

(65) Prior Publication Data
US 2016/0185262 A1    Jun. 30, 2016

(30) Foreign Application Priority Data
Aug. 2, 2013    (CN) .......................... 2013 1 0334844

(51) Int. Cl.
*A47C 1/08* (2006.01)
*B60N 2/28* (2006.01)
(52) U.S. Cl.
CPC .......... B60N 2/2803 (2013.01); B60N 2/2806 (2013.01); B60N 2/2821 (2013.01); *B60N 2/286* (2013.01); *B60N 2/2845* (2013.01); *B60N 2/2863* (2013.01)

(58) Field of Classification Search
CPC .... B60N 2/2821; B60N 2/286; B60N 2/2806; B60N 2/2845; B60N 2/2863
USPC ........................................... 297/250.1, 256.16
See application file for complete search history.

(56) References Cited

U.S. PATENT DOCUMENTS

| | | | |
|---|---|---|---|
| 5,915,787 A | 6/1999 | Brookman | |
| 6,672,664 B2 * | 1/2004 | Yanaka | B60N 2/2806 24/134 KB |
| 7,926,874 B2 * | 4/2011 | Hendry | B60N 2/2806 297/250.1 |
| 7,988,230 B2 * | 8/2011 | Heisey | B60N 2/2821 297/250.1 |

(Continued)

FOREIGN PATENT DOCUMENTS

| | | |
|---|---|---|
| CN | 1348887 A | 5/2002 |
| CN | 103507674 A | 1/2014 |

*Primary Examiner* — Syed A Islam
(74) *Attorney, Agent, or Firm* — Stites & Harbison PLLC; Richard S. Myers, Jr.

(57) ABSTRACT

A child car seat that includes a base seat (1), and a clamping arrangement. The clamping arrangement includes a press rod (3). During actual use, the safety belt (2) is arranged to pass through a position between the press rod (3) and the base seat (1), that is, a part of the safety belt (2) is located at a region on the base seat (1) corresponding to the position of the press rod (3), and the part of the safety belt (2) is clamped when the press rod (3 is closed with respect to the base seat (1). By rotating the press rod (3) to be closed with respect to the base seat (1), the safety belt (2) can be clamped. This clamping manner is reliable and firm, and is simple in operation.

10 Claims, 5 Drawing Sheets

(56) References Cited

U.S. PATENT DOCUMENTS

| | | | | |
|---|---|---|---|---|
| 8,322,788 B2* | 12/2012 | Williams | ............ | B60N 2/2806 297/256.16 |
| 8,955,915 B2* | 2/2015 | Mason | ................. | B60N 2/2812 297/216.11 |
| 8,973,991 B2* | 3/2015 | Wuerstl | ............... | B60N 2/2806 297/253 |
| 2006/0006714 A1* | 1/2006 | Van Geer | ............. | B60N 2/2806 297/256.16 |
| 2009/0066130 A1* | 3/2009 | Shafer | .................. | B60N 2/2806 297/256.16 |
| 2014/0062150 A1* | 3/2014 | Strong | .................... | B60N 2/46 297/250.1 |
| 2014/0084649 A1* | 3/2014 | Guo | .................... | B60N 2/2806 297/250.1 |
| 2014/0300155 A1* | 10/2014 | Lehman | ............... | B60N 2/2821 297/256.16 |

\* cited by examiner

CHILD CAR SEAT

CROSS REFERENCE TO RELATED APPLICATIONS

This application is a § 371 National State Application of PCT/CN2013/083614 filed Sept. 17, 2013 which claims priority to CN 201310334844.5 filed Aug. 2, 2013.

TECHNICAL FIELD

The present invention relates to a child car seat

BACKGROUND OF INVENTION

A child car seat is usually provided with a safe belt for safely protecting the child seating on it, and the safe belt is required to be clamped and positioned during actual use. The existing child car seats are generally provided with a push-button type of positioning block on the base seat. By pressing the positioning block, the positioning block coordinates with the base seat to clamp the safe belt. A installing groove is required to provide on the base seat to correspond to the positioning block. But in actual use, the safe belt is in a free state before being clamped, that is, the safe belt is apt to shift with respect to the installing groove, therefore, the safe belt is not easy to be stuck in the installing groove when pressing the positioning block. Moreover, even though the safe belt and the installing groove are aligned manually before pressing the positioning block, there are still other problems, that is, a great press force is needed to press the sate belt tight, and the positioning block has a hidden risk to come out from the installing groove, affecting the actual property of the safe belt.

SUMMARY

The present invention is intended to provide a child at seat with a damping arrangement for safe belt, which can conveniently fasten the safe belt to the car seat.

To achieve the above purpose, the present invention employs the following technical scheme: a child car seat comprises a base seat, and a clamping arrangement provided on the base seat for clamping a safety belt to the base seat, the damping arrangement comprising a press rod pivoted to the has seat via a rotating shaft and locking mechanism, wherein the press rod is open or closed with respect to the base seat by means of rotation about the rotating shaft, and the locking mechanism is used to lock the press rod to a position in which the press rod is closed with respect to the base seat. During actual use, after the safe belt is installed, a part of the safety belt is located at a region on the base seat corresponding to the position of the press rod, and the part of the safety belt is clamped when the press rod is closed with respect to the base seat. In usage, by arranging the safe belt to pass through between the press rod and the base seat, and rotating the press rod to be closed with respect to the base seat, the safety belt can be clamped.

In a preferred embodiment, the locking mechanism comprises a locking hook rotatably connected to the base seat, and the locking hook hooks the press rod to keep the press rod closed with respect to the base seat so as to clamp a part of the safe belt when the locking mechanism is in a lock state, and the locking hook is able to rotate and leave away from the press rod such that the press rod is released and able to be opened with respect to the base seat.

More preferably, the press rod has a proximal end connected with the base seat via a rotating shaft, and a distal end where the locking hook hooks the press rod. Furthermore, an operating arm is provided on the distal end of the press rod, a sliding block is provided on the operating arm and able to slide along a path, and a shift rod is provided on the locking hook, and the shift rod stretches into the path along which the sliding block slides with respect to the operating arm when the locking mechanism is in the lock state, and the sliding block drives the locking hook to rotate and leave away from the press rod by sliding with respect to the operating arm to drive the shift rod.

In a more specific embodiment, a hand grip is provided on the operating arm for holding by an operator. And preferred, a control element is provided on the hand grip for controlling sliding of the sliding block. The Operator operates the control element at the time holding the hand grip by single hand so as to slide the sliding block to unlock the locking mechanism, and after the press rod is released, the operator can hold the hand grip and rotate the press rod.

In a particular embodiment, a locking shaft is provided on the distal end of the press rod, and the locking hook hooks the locking shaft when the locking mechanism is in the lock state.

Further, the locking hook is rotatably connected to the base seat via a pin shaft, and an elastic element is connected between the locking hook and the base seat for supplying an acting force to the locking hook to keep the locking hook in the state of hooking the press rod. Usually, the elastic element is a spring, but may also be other components with elasticity.

In a specific embodiment, one of the press rod and the base seat is provided with a recess portion, and the other one is provided with a raised portion for pressing the part of the safe belt into the recess portion, and after pressing the part of the safe belt into the recess portion, the raised portion is capable of coordinating with the recess portion to clamp the safe belt tightly.

More Further, the raised portion is thrilled on the press rod, and the recess portion is formed on the base seat.

The raised portion is preferably a plurality of convex ribs protruding outwards along the thickness direction of the press rod.

Due to the use of the above mentioned technical scheme, the present invention has the following advantages over the prior art: by providing a rotatable press rod on the base seat of the car seat, the clamping of the safe belt is achieved by rotate the press rod which is labor-saving and easy to operate, and connecting between the press rod and the safe belt as well as the coordinating of the press rod and the base seat to clamp the safe belt make that the safe belt, is not easy to offset. Moreover, the locking mechanism locks the press rod when the press rod is closed with respect to the base seat such that the safe belt can keep in a clamped state steadily. The whole operating process is achieved by rotating the press rod to close it with respect to the base seat and by locking the press rod with respect to the base seat, and there is no need for a great force to operate.

BRIEF DESCRIPTION OF DRAWINGS

in FIG. 3 along a direction perpendicular to the thickness direction of the safe belt, wherein the raised portion on the press rod and the recess portion on the base seat are shown;

Figure 1:
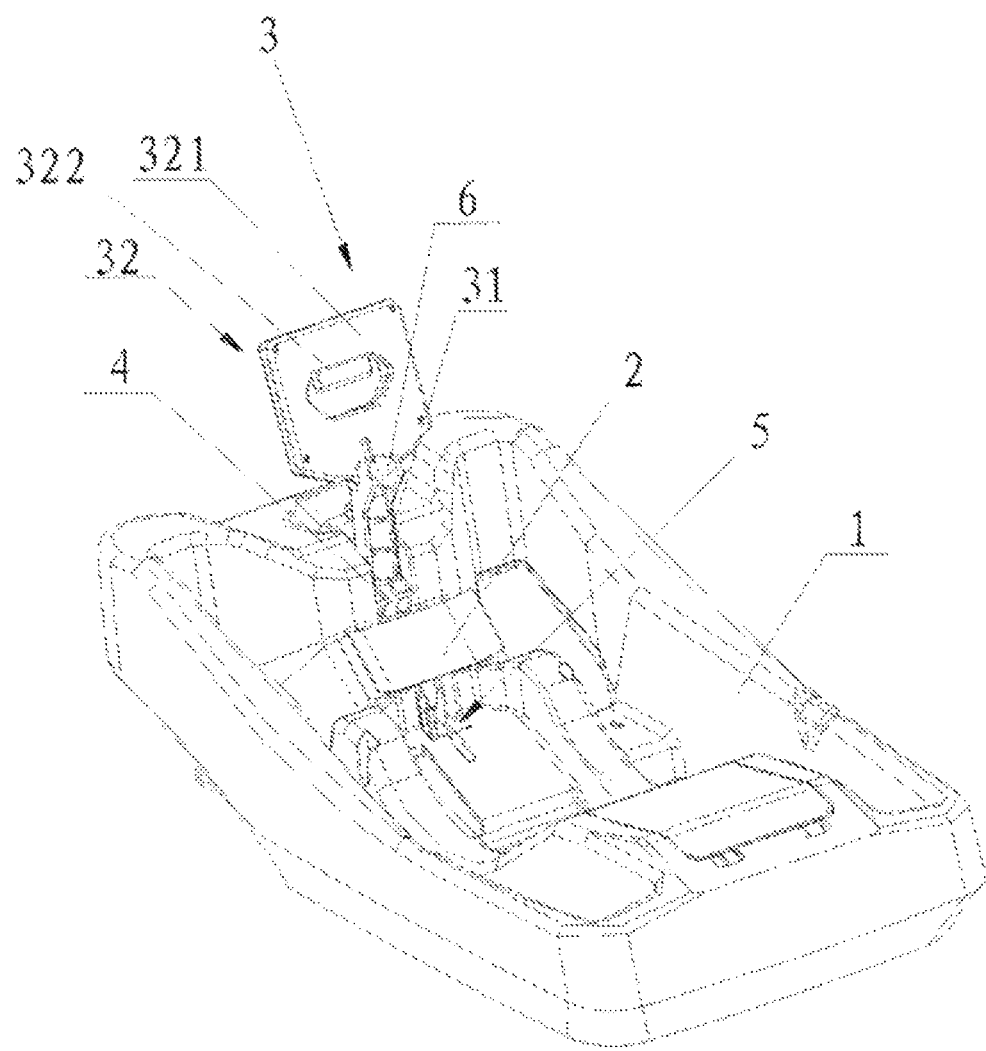
FIG. 1 is a tridimensional schematic diagram of a child car seat according to the present invention, a clamping arrangement of which is in non-clamping state.
Figure 2:
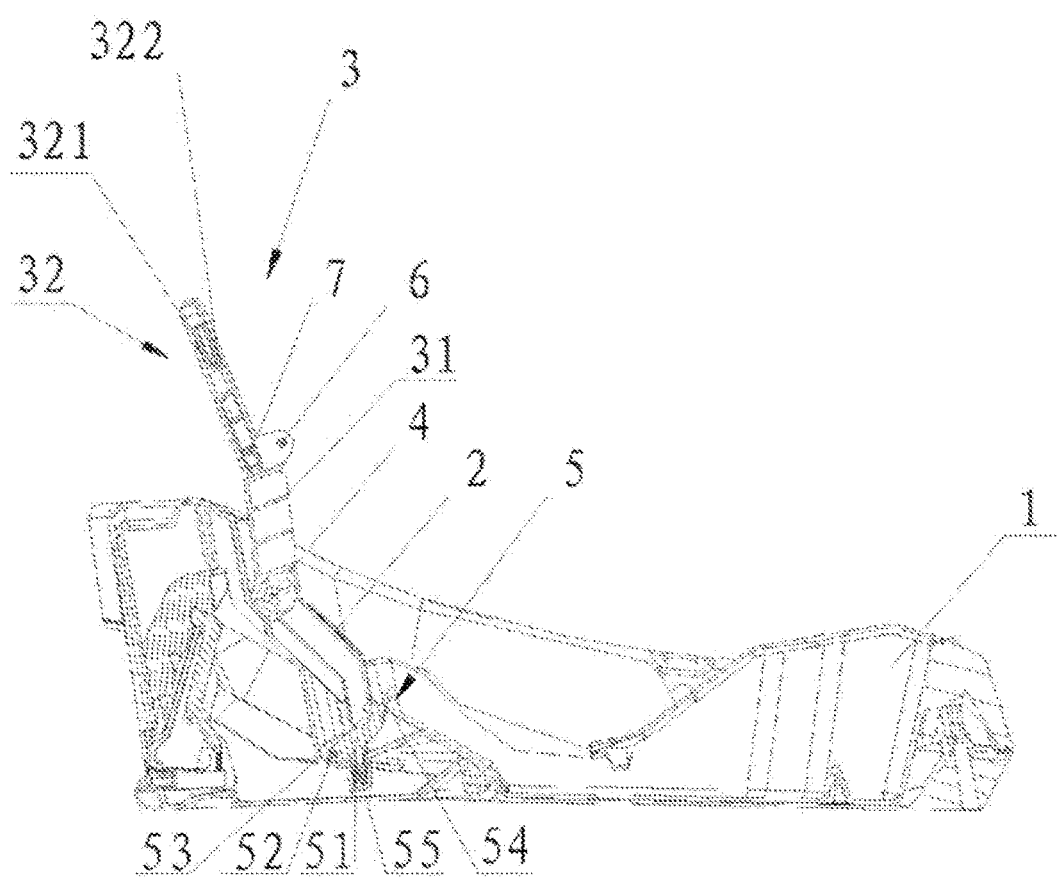
FIG. 2 is a sectional schematic diagram of the child car seat shown in FIG. 1.

wherein: 1. base seat; 11. recess portion; 2. safe belt; 3. press rod; 31. raised portion; 32 operating arm; 321. hand grip; 322. control element; 4. rotating shaft; 5. locking mechanism; 51. locking hook; 52, pin shaft; 53, locking groove; 54. shift rod; 55. elastic element; 6. locking shaft; 7. sliding block.

DETAILED DESCRIPTION OF EMBODIMENTS

In the following, the preferable embodiments of the present invention are explained in detail combining with the accompanying drawings.

Referring to the embodiments shown in FIGS. 1-5, a child car seat shown comprises a base seat 1, and a press rod 3 pivoted to the base seat 1 via a rotating shaft 4. The press rod 3 is open or closed with respect to the base seat 1 by means of rotation about the rotating shaft 4.

A safe belt 2 for protecting a child is provided on the base seat 1, and a part of the safety belt 2 is located at a region on the base seat 1 corresponding to the position of the press rod 3. The part of the safety belt 2 is clamped when the press rod 3 is closed with respect to the base seat 1.

The press rod 3 is locked with respect to the base seat 1 via the locking mechanism 5 when the press rod 3 is closed with respect to the base seat 1.

The locking mechanism 5 comprises a locking hook 51 rotatably connected to the base seat 1 via a pin shaft 52, and the locking hook 51 hooks the press rod 3 to keep the press rod 3 closed with respect to the base seat 1 so as to clamp a part of the safe belt 2 when the locking mechanism 5 is in the lock state. An elastic element 55 is connected between the locking hook 51 and the base seat 1 for supplying an acting force to the locking hook 51 to keep the locking hook 51 in the state of hooking the press rod 3. The locking hook 51 can overcome the applied force from elastic element 55 to rotate and leave away from the press rod 3 such that the press rod 3 is released and may be opened with respect to the base seat 1.

The press rod 3 has a proximal end connected to a rotating shaft 4, and a distal end having a locking shaft 6. By hooking the locking shaft 6 via locking hook 51, the press rod 3 is locked.

An operating arm 32 is provided on the distal end of the press rod 3, and a hand grip 321 is preferred to be provided on the operating arm 32 for holding by a operator so as to execute the operation of rotating the press rod 3 by the operator. A sliding block 7 is provided on the operating arm 32 and able to slide along a path with respect to the operating arm 32. A shift rod 54 is provided on the locking hook 51, and the shift rod 54 stretches into the path along which the sliding block 7 slides with respect to the operating arm 32 when the locking mechanism 5 is in the lock state. The sliding block 7 controls the locking hook 51 to rotate and leave away from the press rod 3 by sliding with respect to the operating arm 32 to drive the shift rod 54.

In a preferred embodiment shown in figures, a cavity in which the sliding block 7 is hidden is formed inside of the operating arm 32. A control element 322 is provided on the hand grip 321 for controlling sliding of the sliding block 7. In this manner, the user can complete unlocking and rotation of the press rod by single hand.

Figure 4:
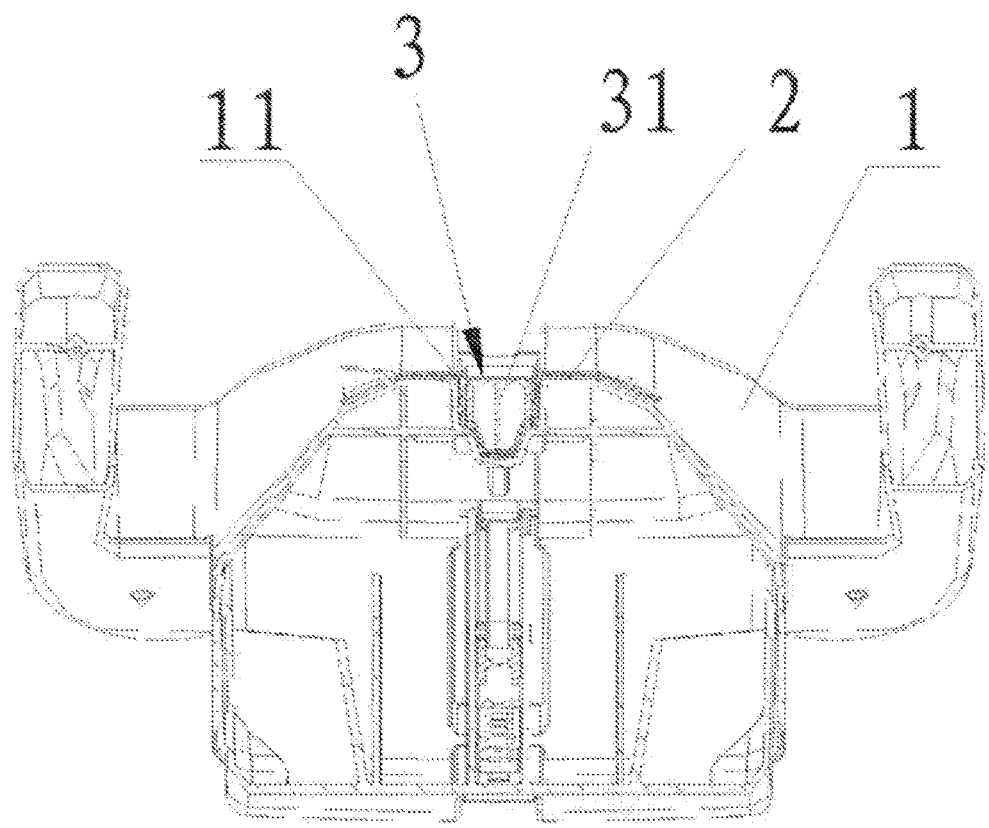
FIG. 4 is a sectional schematic diagram of the child car seat shown.

As shown in FIG. 4, a recess portion 11 is sunken formed on a surface of base seat I opposite to the press rod 3, and a raised portion 31 is formed on the press rod 3 correspondingly. The raised portion 31 presses the part of the safe belt 2 into the recess portion 11, and the part of the safe belt 2 is clamped tightly by the coordination between the raised portion 31 and the recess portion 11 when the press rod 3 is closed with respect to seat base 1.

The shape of the raised portion 31 is preferred to be matched up with that of the recess portion 11. In a preferred embodiment employed by the present invention, the raised portion 31 is a plurality of convex ribs protruding outwards along the thickness direction of the press rod 3, and the recess portion 11 may be one or more. The number and position of the raised portion 31 should correspond to those of the recess portion 11.

The formation positions of the recess portion and the raised portion are interchangable, that is the recess portion may be formed on the press rod 3 and the raised portion on the base seat. The technicist in the art may make variations according to the above description.

Figure 3:
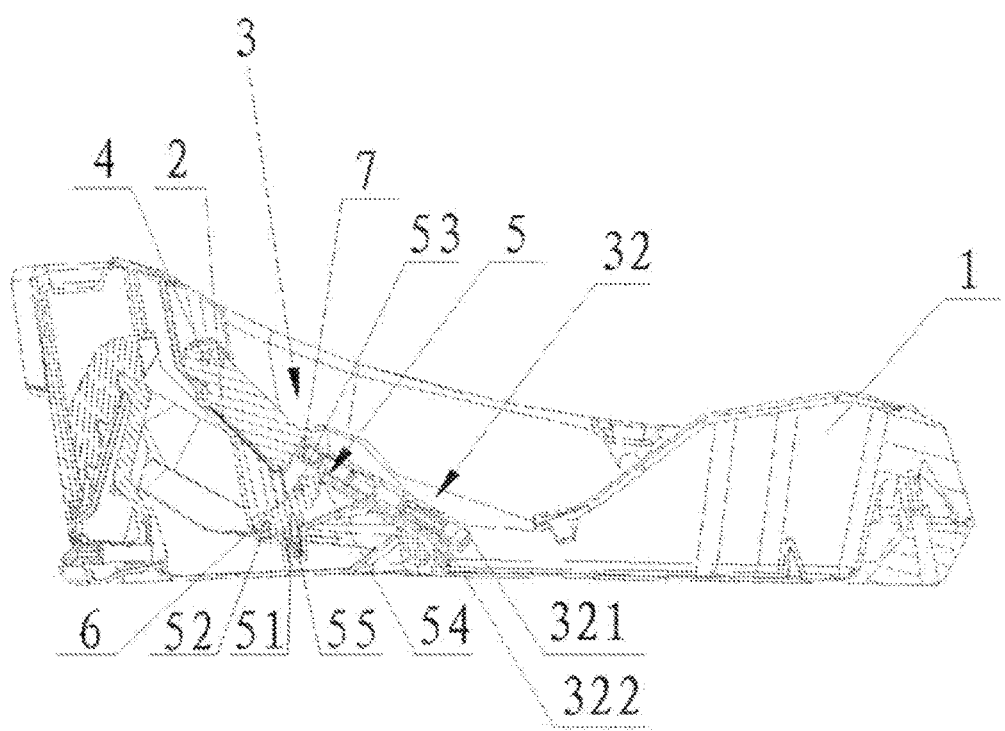
FIG. 3 is a sectional schematic diagram of the child car seat shown in FIG. 2 after changing the state, the clamping arrangement of which is in clamping state.

By holding the hang grip 321 and pressing the operating arm 32, the operator may rotate the press rod 3 easily to close it with respect to the base seat 1 which is shown in FIGS. 3-4. By this time, the raised portion 31 presses the safe belt 2. into the recess portion 11.

Figure 5:
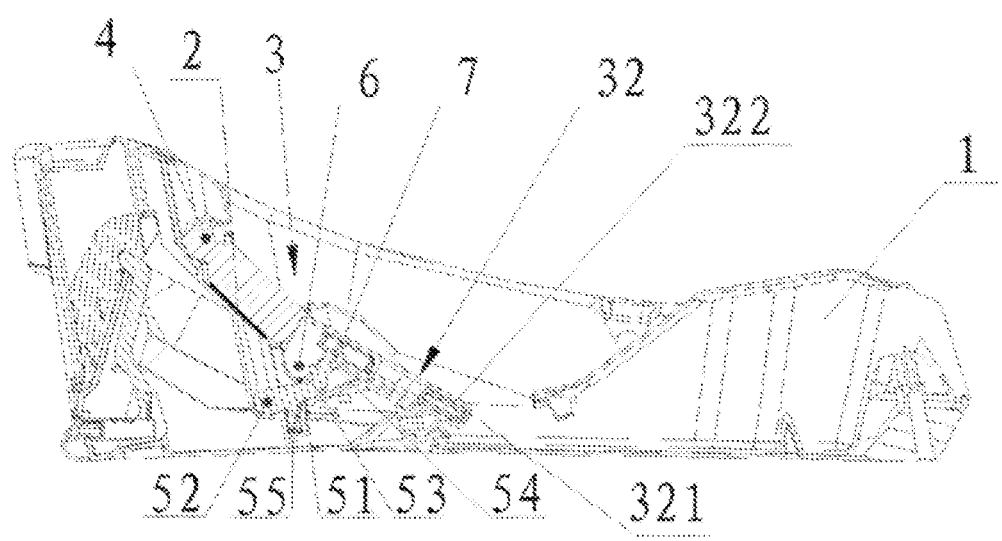
FIG. 5 is a sectional schematic diagram of the child car seat shown in FIG. 3 after changing the state, wherein the locking mechanism for locking the press rod is in an unlock state.

When the safe belt is needed to be released, the operator holds the hand grip 321, controls the sliding block 7 to slide by pressing the control element 322, pushes the shift rod 54 when the sliding block 7 slides such that the locking hook 51 rotates about the pin shaft 52 until the locking shaft 6 leaves away from the locking groove 53 on the locking hook 51 so as to unlock the press rod 3, as shown in FIG. 5. Then the operator may lift up the press rod 3 to release the safe belt 2, and the safe belt 2 may be unlocked.

The child car seat according to the above-mentioned embodiments of the present invention is easy to fasten the safe belt 2 and does not need a great strength to install, and the fastening is stable and reliable.

The embodiments described above are only for illustrating the technical concepts and features of the present invention, and intended to make those skilled in the art being able to understand the present invention and thereby implement it, and should not be concluded to limit the protective scope of this invention. Any equivalent variations or modifications according to the spirit of the present invention should be covered by the protective scope of the present invention.

What is claimed is:

1. A child car seat comprising a base seat (1), and a clamping arrangement provided on the base seat (1) for clamping a safety belt (2) to the base seat (1), is characterized in that, the clamping arrangement comprises:
   a press rod (3) pivoted to the base seat (1) via a rotating shaft (4), the press rod (3) configured to be open or closed with respect to the base seat(1) by rotating around the rotating shaft (4), and a part of the safety belt (2) being located at a region on the base seat (1) corresponding to the position of the press rod (3), the part of the safety belt (2) being clamped when the press rod (3) is closed with respect to the base seat (1); and a locking mechanism (5) configured to lock the press rod (3) to a position in which the press rod (3) is closed with respect to the base seat (1), the locking mechanism (5) comprising a locking hook (51) rotatably connected to the base seat (1), and the locking hook (51) hooks the press rod (3) to keep the press rod (3) closed with respect to the base seat (1) so as to clamp a part of the safe belt (2) when the locking mechanism (5) is in a lock state, and the locking hook (51) is able to rotate and leave away from the press rod (3) such that the press rod (3) is released and able to be opened with respect to the base seat (1);

the press rod (3) having a proximal end connected with the base seat (1) via the rotating shaft (4) and a distal end, and the locking hook (51) hooks the press rod (3) at the distal end of the press rod (3); and an operating arm (32) provided on the distal end of the press rod (3), a sliding block (7) provided on the operating arm (32) and able to slide along a path, and a shift rod (54) provided on the locking hook (51), the shift rod (54) stretching into the path along which the sliding block (7) slides with respect to the operating arm (32) when the locking mechanism (5) is in the lock state, and the sliding block (7) controls the locking hook (51) to rotate and leave away from the press rod (3) by sliding with respect to the operating arm (32) to drive the shift rod (54).

2. The child car seat according to claim 1, wherein a hand grip (321) is provided on the operating arm (32) for holding by an operator.

3. The child car seat according to claim 2, wherein a control element (322) is provided on the hand grip (321) for controlling sliding of the sliding block (7).

4. The child car seat according to claim 1, wherein a locking shaft (6) is provided on the distal end of the press rod (3), and the locking hook (51) hooks the locking shaft (6) when the locking mechanism is in the lock state.

5. The child car seat according to claim 1, wherein the locking hook (51) is rotatably connected to the base seat (1) via a pin shaft (52), and an elastic element (55) is connected between the locking hook (51) and the base seat (1) for supplying an acting force to the locking hook (51) to keep the locking hook (51) in the state of hooking the press rod (3).

6. The child car seat according to claim 1, wherein one of the press rod (3) and the base seat (1) is provided with a recess portion (11), and the other one is provided with a raised portion (31) for pressing the part of the safe belt (2) into the recess portion, and after pressing the part of the safe belt (2) into the recess portion (11), the raised portion (31) is capable of coordinating with the recess portion to clamp the safe belt (2).

7. The child car seat according to claim 6, wherein the raised portion (31) is formed on the press rod (3), and the recess portion is formed on the base seat (1).

8. The child car seat according to claim 6, wherein the raised portion (31) is a plurality of convex ribs protruding outwards along the thickness direction of the press rod (3).

9. The child car seat according to claim 1, wherein a locking shaft (6) is provided on the distal end of the press rod (3), and the locking hook (51) hooks the locking shaft (6) when the locking mechanism is in the lock state.

10. The child car seat according to claim 7, wherein the raised portion (31) is a plurality of convex ribs protruding outwards along the thickness direction of the press rod (3).

* * * * *